(12) United States Patent
Misumi

(10) Patent No.: US 6,923,207 B2
(45) Date of Patent: Aug. 2, 2005

(54) MANIFOLD VALVE HAVING POSITION DETECTING MECHANISM

(75) Inventor: Keiji Misumi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 237 days.

(21) Appl. No.: 10/407,429

(22) Filed: Apr. 7, 2003

(65) Prior Publication Data

US 2003/0234050 A1 Dec. 25, 2003

(30) Foreign Application Priority Data

Jun. 25, 2002 (JP) ........................................ 2002-185139

(51) Int. Cl.[7] ........................ F16K 37/00; F15B 13/043
(52) U.S. Cl. ...................... 137/554; 137/552; 137/557; 137/625.64; 137/884
(58) Field of Search .............................. 137/552, 554, 137/557, 625.64, 625.65, 884

(56) References Cited

U.S. PATENT DOCUMENTS

| | | | | |
|---|---|---|---|---|
| 5,964,244 A | * | 10/1999 | Hiramatsu et al. | 137/625.64 |
| 6,109,298 A | * | 8/2000 | Kaneko et al. | 137/625.64 |
| 6,186,161 B1 | * | 2/2001 | Hiramatsu | 137/625.64 |
| 6,505,642 B2 | * | 1/2003 | Miyazoe et al. | 137/554 |
| 6,520,202 B2 | * | 2/2003 | Miyazoe et al. | 137/554 |
| 6,591,865 B2 | * | 7/2003 | Misumi | 137/554 |
| 6,612,332 B2 | * | 9/2003 | Miyazoe et al. | 137/552 |
| 6,840,273 B2 | * | 1/2005 | Miyazoe et al. | 137/554 |
| 2002/0026959 A1 | | 3/2002 | Miyazoe et al. | |
| 2002/0092571 A1 | | 7/2002 | Misumi | |

FOREIGN PATENT DOCUMENTS

EP          1 223 372        7/2002

* cited by examiner

Primary Examiner—John Rivell
(74) Attorney, Agent, or Firm—Oblon, Spivak, McClelland, Maier & Neustadt, P.C.

(57) ABSTRACT

In a manifold valve, a part housing chamber and a fist recessed portion are provided to a casing of a selector valve, position sensors for detecting an operating position of a spool are housed in the part housing chamber, a first relay connector connected to both the position sensors and pilot valves is housed in the first recessed portion, a second recessed portion corresponding to the first recessed portion and a substrate housing chamber are provided to a manifold base, a second relay connector to be electrically connected to the first relay connector by mounting the selector valve onto a placing face is housed in the second recessed portion, and a main wiring substrate electrically connected to the second relay connector is housed in the substrate housing chamber.

6 Claims, 3 Drawing Sheets

FIG. 3

MANIFOLD VALVE HAVING POSITION DETECTING MECHANISM

TECHNICAL FIELD TO WHICH THE INVENTION BELONGS

The present invention relates to a manifold valve having a position detecting mechanism with a function of detecting an operating position of a selector valve mounted onto a manifold base.

PRIOR ART

There is a known selector valve in which an operating position of a spool can be detected by a sensor as disclosed in Japanese Utility Model Application Laid-open No. 2-66784, for example. This selector valve is formed by mounting a magnet to an outer periphery of the spool and mounting the magnetometric sensor for sensing magnetism to a casing. When the spool moves to one selecting position, the magnetometric sensor senses the magnet and is turned on. When the spool moves to the other selecting position, the magnetometric sensor is separated from the magnet and turned off. The magnetometric sensor is connected to a controller by a lead wire which is led outside from the casing of the selector valve.

On the other hand, selector valves of this type include one used as a manifold valve by being placed on a manifold base. This manifold valve is normally formed by placing one or more selector valves on the manifold base such that pressure fluid and driving power are supplied to the respective selector valves through the manifold base.

In such a manifold valve, similarly to the above-described known art, it is possible to detect the operating positions of the respective selector valves by using the magnet and the magnetometric sensor. In this case, however, it is necessary to route a lead wire outside the casing and to introduce and connect the lead wire into an electric connection portion of the manifold base if the lead wire from the magnetometric sensor is lead out of the casing of the selector valve like in the know art. As a result, problems such as burdensome and disorderly wiring and interference of the lead wire with other members are likely to occur. Because the sensor connected by the lead wire to the manifold base has to be detached from the casing or the lead wire has to be cut off from the manifold base in order to separate the manifold base and the selector valve from each other in maintenance, handling is burdensome.

Although the operating positions of the spool can be detected not only by the above-described method in which the magnet is detected by the magnetometric sensor but also by a method in which pressure of an output port is detected by a pressure sensor, the above-described same problems occur in such a case.

Moreover, if the operating positions of the spool are detected in this manner, it is desirable that an operating state of the spool is indicated by a simple indicating mechanism on the selector valve.

DISCLOSURE OF THE INVENTION

It is a main technical object of the present invention to provide a manifold valve having a position detecting mechanism in which mounting of position sensors to a selector valve is easy and wiring between the position sensors and a manifold base is easy and which is easy to handle in maintenance.

In addition to the above object, it is another technical object of the invention to reliably indicate an operating state of a spool on the selector valve with a simple indicating mechanism.

To achieve the above object, according the invention, there is provided a manifold valve comprising a selector valve for selecting a flow path of pressure fluid and a manifold base mounted with the selector valve.

The selector valve includes a casing having a mounting face to be mounted to the manifold base, a spool provided in the casing to select the flow path, and one or two solenoid-operated pilot valve(s) for driving the spool. The casing includes a first recessed portion formed at a portion of the mounting face and a part housing chamber formed at a different position from the first recessed portion. One or more position sensors for detecting an operating position of the spool are housed in the part housing chamber. A first relay connector for both signal transmission and feeding and electrically connected to both the position sensors and pilot valves is housed in the first recessed portion.

The manifold base includes a placing face on which the selector valve is mounted, a second recessed portion formed at a position on the placing face corresponding to the first recessed portion, and a substrate housing chamber inside the base and connected to the second recessed portion. A second relay connector to be electrically connected to the first relay connector by mounting the selector valve onto the placing face is housed in the second recessed portion. A main wiring substrate for signal processing, signal transmission, and feeding and electrically connected to the second relay connector is housed in the substrate housing chamber.

In the manifold valve of the invention having the above structure, the part housing chamber and the first recessed portion are provided in the casing of the selector valve, the position sensors are disposed in the part housing chamber, the first relay connector is housed in the first recessed portion, the first relay connector is electrically connected to both the position sensors and the pilot valves. As a result, by only mounting the selector valve onto the manifold base, the first relay connector is connected to the second relay connector of the manifold base and the position sensors and the pilot valves are electrically connected to the main wiring substrate in the manifold base.

Therefore, not only mounting of the position sensors to the selector valve but also connection of the position sensors and the pilot valves is easy because the position sensors and the pilot valves are connected to the main wiring substrate through the common relay connector. Moreover, because there is no need to route the lead wires from the position sensors and the pilot valves outside, wiring is easy. Furthermore, because there is no need to detach the position sensors from the selector valve or to cut the lead wire between the selector valve and the manifold base in order to separate the manifold base and the selector valve from each other in maintenance, handling is easy.

According to a concrete structural form of the invention, the part housing chamber is formed on an upper face side of the casing and is covered with a detachable cover. A lamp substrate is disposed in the part housing chamber and is electrically connected to both the pilot valves and position sensors. Lamps for individually indicating operating states of the pilot valves and the position sensors are mounted onto the lamp substrate, and the cover is provided with an indicating window through which the lamps are observed.

With this structure, the operating state of the spool can be reliably indicated on the selector valve with a simple indicating mechanism.

According to a further concrete structural form of the invention, substrate supports to be brought into continuity with the pilot valves and also functioning as terminals are provided in the part housing chamber, support legs also functioning as connectors are provided to the lamp substrate, the lamp substrate is detachably disposed in the part housing chamber by supporting the support legs on the substrate supports in electrically connected states, and a sensor connector for electrically connecting the position sensors to the lamp substrate and the first relay connector is detachably connected to the lamp substrate.

In the invention, the position sensor(s) is (are) a magnetometric sensor for detecting a magnet mounted to the spool and/or a pressure sensor for detecting fluid pressure of an output flow path.

BRIEF DESCRIPTION OF THE DRAWINGS

FIG. 3 is a sectional view of a second embodiment of the manifold valve according to the invention.

DETAILED DESCRIPTION

Figure 1:
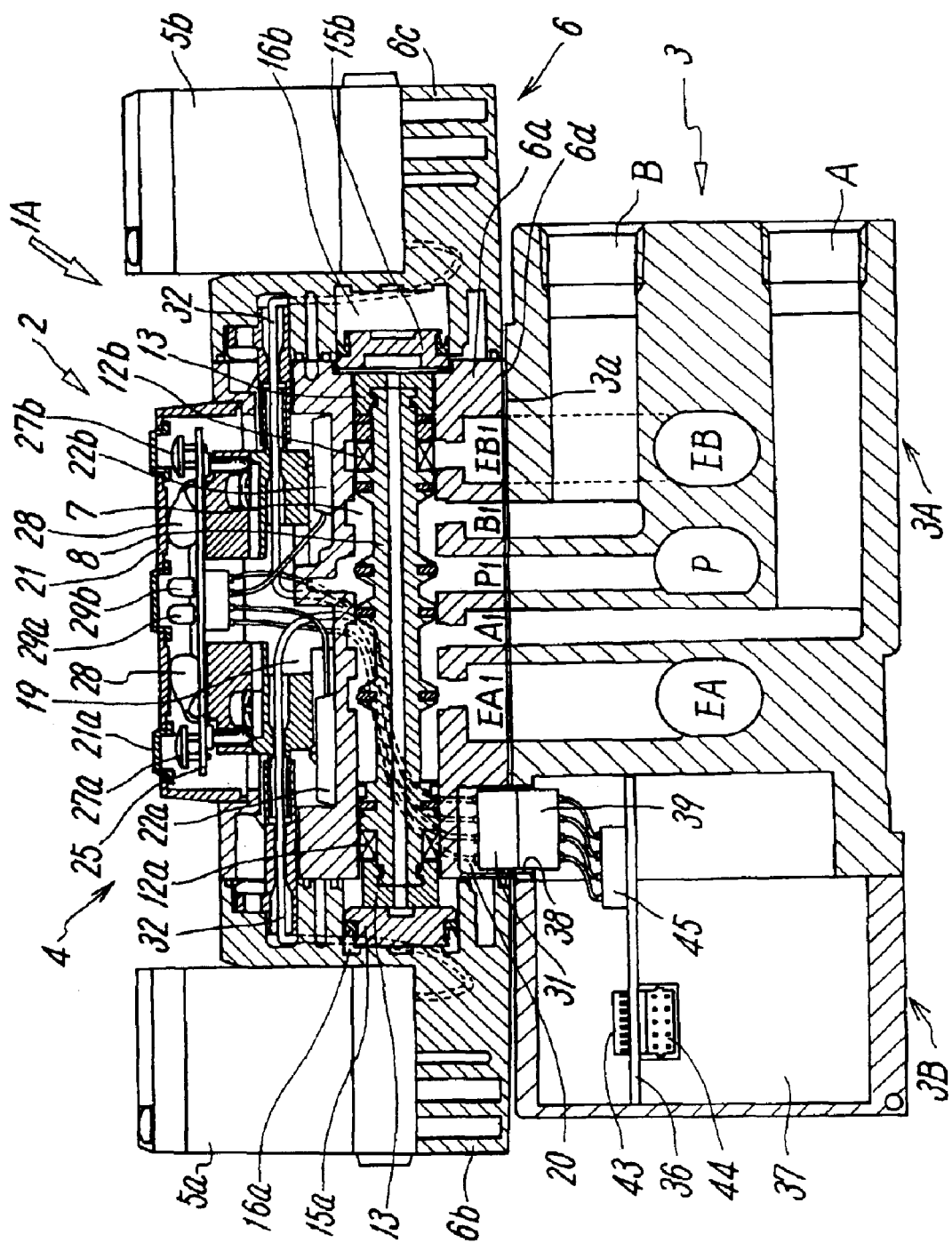
FIG. 1 is a sectional view of a first embodiment of a manifold valve according to the present invention.

FIG. 1 shows a first embodiment of a manifold valve according to the present invention. The manifold valve 1A is formed of a selector valve 2 for selecting a flow path of pressure fluid such as compressed air and a manifold base 3 mounted with the selector valve 2 to supply the pressure fluid and driving power and transmit a control electric signal from the manifold base 3 to the selector valve 2.

The selector valve 2 is a pilot-type selector valve and includes a main valve portion 4 having a five-port valve structure and solenoid-operated pilot valves 5a and 5b connected to the main valve portion 4 to switch a spool 8 mounted in the main valve portion 4 with the pilot valves 5a and 5b. Therefore, the pilot valves 5a, 5b form a driving mechanism for driving the spool 8.

The main valve portion 4 includes a casing 6 formed of non-magnetic material. The casing 6 is formed of a main block 6a positioned in a center and two end blocks 6b and 6c respectively connected to opposite ends of the main block 6a. The pilot valves 5a and 5b are respectively mounted to the end blocks 6b and 6c. A lower face of the casing 6 and especially a lower face of the main block 6a is formed as a substantially flat mounting face 6d to be joined to a placing face 3a on an upper face of the manifold base 3 through a gasket.

Figure 2:
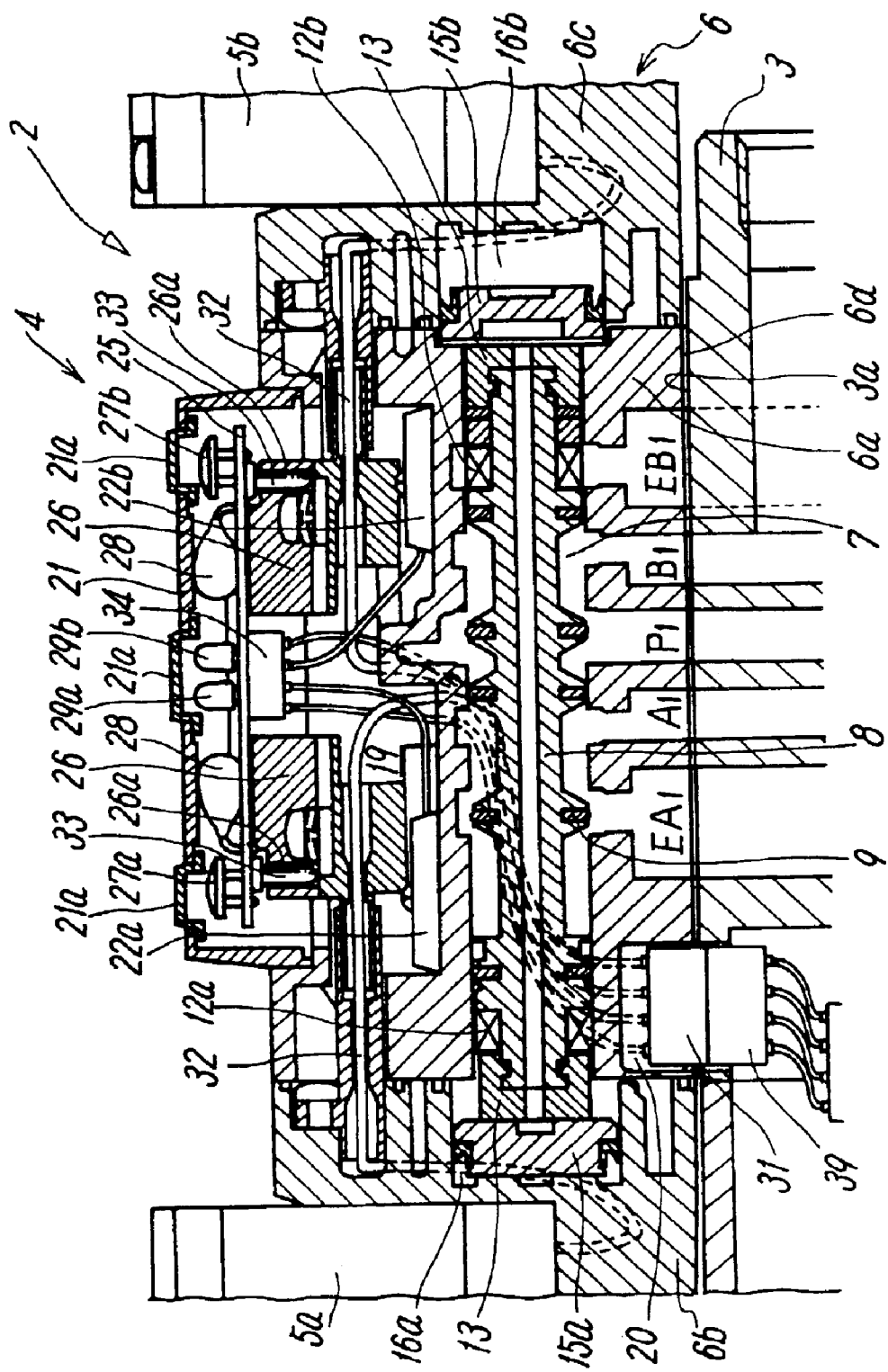
FIG. 2 is an enlarged view of an essential portion of FIG. 1.

As is clear from FIG. 2, a portion of the mounting face 6d corresponding to a bottom face of the main block 6a is provided with a supply through hole $P_1$, two output through holes $A_1$ and $B_1$ positioned on opposite sides of the supply through hole $P_1$, and two discharge through holes $EA_1$ and $EB_1$ positioned on opposite sides of the output through holes $A_1$ and $B_1$. Inside the main block 6a, a valve hole 7 with which the above respective through holes communicate in the above-described arrangement is formed. In the valve hole 7, the spool 8 is housed for sliding. At an outer periphery of the spool 8, a plurality of sealing members 9 for partitioning the flow path between the respective through holes are provided.

Axial opposite ends of the spool 8 are respectively mounted with magnets 12a and 12b for detecting a position. The magnets 12a and 12b are in ring shapes and are fitted over small-diameter portions formed at the end portions of the spool 8. By fitting and bringing annular caps 13 in contact with the magnets 12a and 12b from outer sides, the magnets 12a and 12b are fixed to the end portions of the spool 8 by the caps 13.

In the respective end blocks 6b and 6c connected to the opposite sides of the main block 6a, piston chambers are formed respectively. Pistons 15a and 15b are respectively housed for sliding in the respective piston chambers and are in contact with the spool 8 through the caps 13. Pressure chambers 16a and 16b are formed respectively on back face sides of the respective pistons 15a and 15b and are connected to the pilot valves 5a and 5b by pilot flow paths (not shown) and to the supply through hole $P_1$ through the pilot valves 5a and 5b.

When the first pilot valve 5a is turned off, the first pressure chamber 16a opens into the atmosphere, the second pilot valve 5b is turned on, and pilot fluid is supplied to the second pressure chamber 16b, the spool 8 is pushed by the second piston 15b to occupy a first selecting position where the spool 8 has moved leftward as shown in FIG. 1. If a switch between the pilot valves 5a and 5b is carried out from this state such that the first pilot valve 5a is turned on and that the second pilot valve 5b is turned off, the second pressure chamber 16b opens into the atmosphere and the pilot fluid is supplied to the first pressure chamber 16a. Therefore, the spool 8 is pushed by the first piston 15a, moved rightward, and switched to a second selecting position.

In the casing 6 of the selector valve 2, a part housing portion 19 is formed at a position on an upper face side of the main block 6a and a first recessed portion 20 is formed at a position on the mounting face 6d on a lower face of the main block 6a. The part housing chamber 19 and the first recessed portion 20 communicate with each other through a wiring path. The part housing chamber 19 has a lateral length extending near axial opposite end portions of the valve hole 7 and a bottom portion positioned close to the valve hole 7. An upper face of the part housing chamber 19 is open to an outside and a cover 21 is detachably attached to this open upper face. In the part housing chamber 19, two position sensors 22a and 22b for detecting the magnets 12a and 12b at the opposite ends of the spool 8 are positioned near opposite end portions of a bottom portion of the part housing chamber 19 to respectively correspond to the respective magnets 12a and 12b. At each stroke end of the spool 8, either position sensor 22a or 22b detects the corresponding magnet 12a or 12b. In the example shown in the drawings, the second position sensor 22b on the right side detects the second magnet 12b when the spool 8 moves to the first selecting position on the left and shown in FIG. 1 and the first position sensor 22a on the left side detects the first magnet 12a when the spool 8 moves from the selecting position to the second selecting position on the right. Position detection signals of the spool 8 from the position sensors 22a and 22b are sent to a controller and used for various control and indication.

Because the magnetometric sensors are used as the position sensors 22a and 22b in the first embodiment, the position sensors are referred to as the magnetometric sensors here for the sake of convenience.

In the part housing chamber 19, a lamp substrate 25 is housed by being detachably placed on left and right two substrate supports 26, 26. On the lamp substrate 25, printed wiring is installed and a set including a pilot lamp 27a or 27b for indicating an operating state of the pilot valve 5a or 5b, an electronic component 28 forming a surge protecting circuit, and the like is mounted on each side of the lamp substrate 25 to correspond to each the pilot valve 5a or 5b. Furthermore, at a central portion of the lamp substrate 25, two sensor lamps 29a and 29b for indicating operating states of the magnetometric sensors 22a and 22b are mounted. The sensor lamps 29a and 29b may light up when the magnetometric sensors 22a and 22b are in detecting states, i.e., when they are turned on. It is also possible that the sensor lamp 29a or 29b light up on when the selector valve 2 is in an abnormal state, e.g., when the magnetometric sensor 22a or 22b corresponding to the pilot valve 5a or 5b which is turned on is not turned on. In this case, an electric component such as a semiconductor device for processing actuating signals of the pilot valves 5a and 5b and actuating signals of the magnetometric sensors 22a and 22b is mounted onto the lamp substrate 25.

Indicating windows 21a through which the respective lamps 27a, 27b, 29a, and 29b are observed from outside are respectively provided at positions of the cover 21 corresponding to the lamps. The indicating windows 21a are formed by mounting members with transparency to openings of the cover 21.

The substrate supports 26, 26 also function as connecting terminals and are electrically connected through a connecting mechanism (not shown) to the pilot valves 5a and 5b, a first relay connector 31 in the first recessed portion 20, or relay conductors 32 connecting the pilot valves and the first relay connector. By inserting pin-shaped support legs 33 projecting from a lower face of opposite end portions of the lamp substrate 25 and also functioning as connectors into support holes 26a formed in the respective substrate supports 26, the lamp substrate 25 can be detachably disposed on the substrate supports 26 in electrically connected states. To a lower face of the central portion of the lamp substrate 25, a sensor connector 34 to be brought into continuity with the sensor lamps 29a and 29b is detachably connected. The sensor connector 34 is electrically connected to the respective magnetometric sensors 22a and 22b and the first relay connector 31 by lead wires extending in the part housing chamber 19. The relay conductors 32 extend laterally in the part housing chamber 19. Ends of the relay conductors 32 are connected to the pilot valves 5a and 5b through the end blocks 6b and 6c and the other ends are connected to the first relay connector 31.

Although the one large lamp substrate 25 is disposed and mounted with all the lamps 27a, 27b, 29a, and 29b corresponding to the respective pilot valves 5a and 5b and the magnetometric sensors 22a and 22b in the example shown in the drawings, it is also possible that three small lamp substrates corresponding to the respective pilot valves and the magnetometric sensors are disposed to separately mount the pilot lamps 27a and 27b and the electric components 28 corresponding to the respective pilot valves 5a and 5b onto two of the substrates and to mount the sensor lamps 29a and 29b onto the lest of the substrates.

The first relay connector 31 is both for transmitting signals and feeding, disposed in a fixed manner in the first recessed portion 20 by proper means, electrically connected to the respective pilot valves 5a and 5b through the relay conductors 32, and electrically connected to the magnetometric sensors 22a and 22b through the sensor connector 34.

The manifold base 3 is of a stacking type used by joining a plurality of manifold bases together in a thickness direction and is made of non-magnetic material such that one selector valve 2 can be mounted to the manifold base 3. A half of the manifold base 3 in a longitudinal direction is formed into a flow path forming portion 3A and the other half is formed into an electric connection portion 3B. On an upper face of the manifold base 3, the placing face 3a is formed astride the flow path forming portion 3A and the electric connection portion 3B. The flow path forming portion 3A and the electric connection portion 3B may be formed integrally or may be formed separately and connected to each other.

In the flow path forming portion 3A, a supply flow path P and discharge flow paths EA and EB passing through the manifold base 3 in the thickness direction are formed and two output ports A and B which open in an end face of the manifold base 3 are formed. The supply flow path P, the discharge flow paths EA and EB, and the respective output ports A and B respectively open on the placing face 3a and respectively communicate with the supply through hole $P_1$, the two discharge through holes $EA_1$ and $EB_1$, and the two output through holes $A_1$ and $B_1$ of the selector valve 2 when the selector valve 2 is mounted onto the placing face 3a.

The electric connection portion 3B includes in itself a substrate housing chamber 37 in which a main wiring substrate 36 is housed and a second recessed portion 38 connected to the substrate housing chamber 37 at a position on the placing face 3a corresponding to the first recessed portion 20. In the second recessed portion 38, a second relay connector 39 electrically connected to the first relay connector 31 is disposed. When the selector valve 2 is mounted onto the manifold base 3, the first relay connector 31 and the second relay connector 39 are automatically connected to each other. A sealing member is preferably mounted to a periphery of the second recessed portion 38 such that the first and second recessed portions 20 and 38 are joined to each other with peripheries thereof being sealed with the sealing member when the selector valve 2 is mounted onto the manifold base 3 as described above.

On the main wiring substrate 36, printed wiring is installed and an electronic component 43 for signal processing, a main connector 44 both for transmitting signals and feeding, and a distribution connector 45 are mounted. The electric component 43 is for performing signal processing such as conversion of a control signal for the selector valve 2 and sent from the controller from a parallel signal to a serial signal. The main connector 44 is mainly for transmitting the control signal for the selector valve between the main wiring substrates 36, 36 of the adjacent manifold bases 3, 3, supplying power for driving the selector valve, and transmitting the detection signals from the magnetometric sensors 22a and 22b. When the manifold bases 3, 3 are connected to each other, female and male connecting terminals of the main connectors 44 are connected to each other. The distribution connector 45 is connected to the second relay connector 39 to feed power to the mounted selector valve 2 and to transmit the detection signals from the magnetometric sensors 22a and 22b and is detachably connected to the main wiring substrate 36.

In the manifold valve 1A having the above structure, the part housing chamber 19 and the first recessed portion 20 are provided in the casing 6 of the selector valve 2, the magnetometric sensors 22a and 22b are disposed in the part housing chamber 19, the first relay connector 31 is housed in the first recessed portion 20, the first relay connector 31 is electrically connected to both the magnetometric sensors 22a and 22b and the pilot valves 5a and 5b, the second recessed portion 38 is formed at the position of the manifold base 3 corresponding to the first recessed portion 20, and the sensor connector 34 is provided in the recessed portion 38.

As a result, by only mounting the selector valve 2 onto the manifold base 3, the first relay connector 31 is connected to the second relay connector 39 of the manifold base 3 and the magnetometric sensors 22a and 22b and the pilot valves 5a and 5b are electrically connected to the main wiring substrate 36 in the manifold base 3.

Therefore, not only mounting of the magnetometric sensors 22a and 22b to the selector valve 2 but also connection of the magnetometric sensors 22a and 22b and the pilot valves 5a and 5b is easy because the magnetometric sensors 22a and 22b and the pilot valves 5a and 5b are connected to the main wiring substrate 36 through the common relay connector 31 in a concentrated manner. Moreover, because there is no need to route the lead wires from the magnetometric sensors 22a and 22b and the pilot valves 5a and 5b outside, wiring is easy. Furthermore, because there is no need to detach the magnetometric sensors 22a and 22b from the selector valve 2 or to cut the lead wire between the selector valve 2 and the manifold base 3 in order to separate the manifold base 3 and the selector valve 2 from each other in maintenance, handling is easy.

Figure 3:
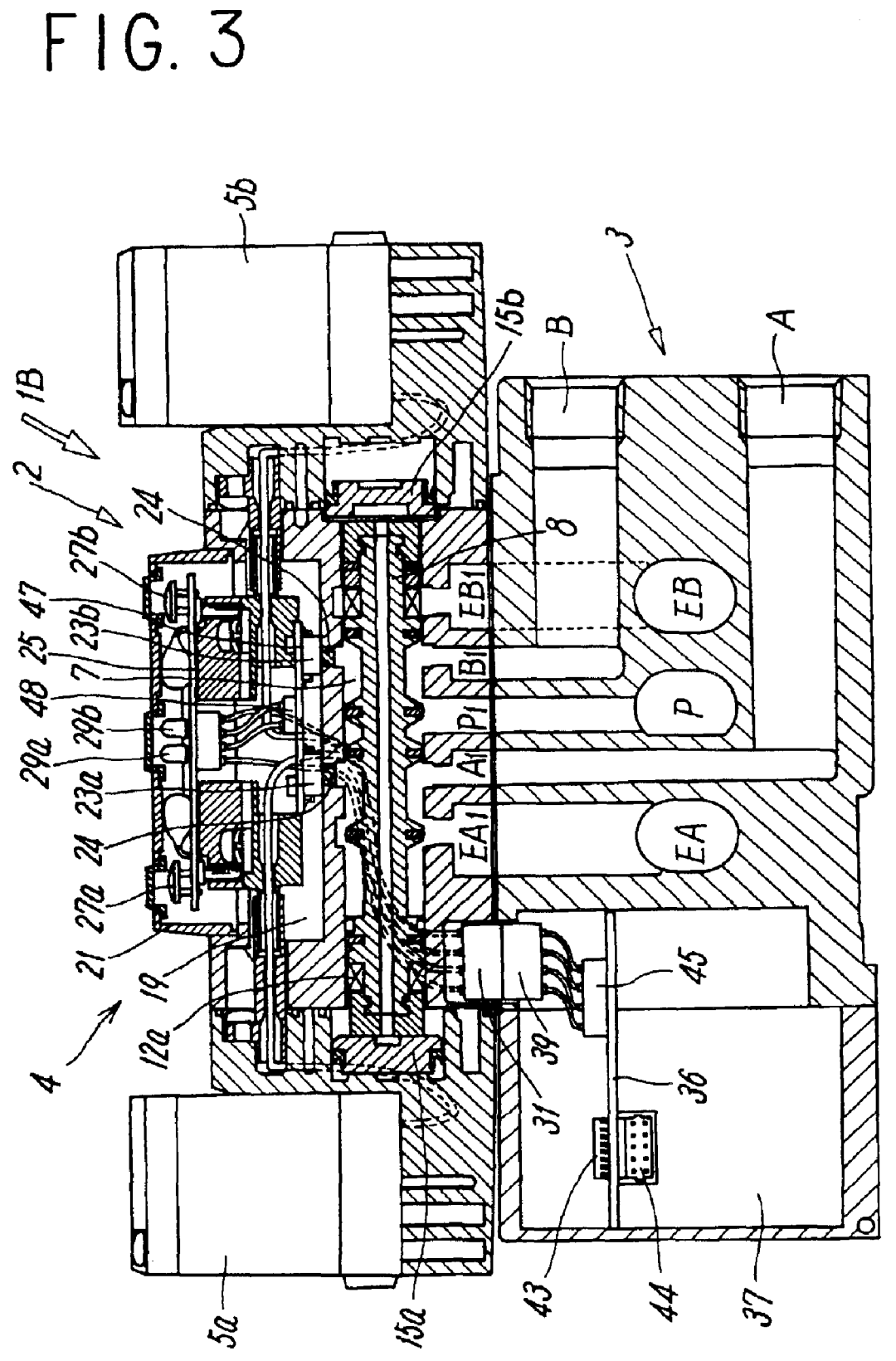

FIG. 3 shows a second embodiment of the manifold valve according to the invention. The manifold valve 1B of the second embodiment is different from the manifold valve 1A of the first embodiment in that pressure sensors 23a and 23b are used as the position sensors to detect fluid pressure in the output flow paths to thereby detect a selecting position of the spool 8 in the second embodiment while the magnetometric sensors 22a and 22b are used as position sensors to detect the magnets 12a and 12b mounted to the spool 8 in the first embodiment.

Therefore, in the part housing chamber 19 of the selector valve 2, the two pressure sensors 23a and 23b are disposed instead of the magnetometric sensors 22a and 22b and detecting portions 24 of the pressure sensors 23a and 23b are disposed at positions of the valve hole 7 corresponding to the output through holes $A_1$ and $B_1$. The two pressure sensors 23a and 23b are mounted to a sensor substrate 47 and are electrically connected to a sensor connector 34 through an auxiliary connector 48 detachably connected to the sensor substrate 47.

In the second embodiment, when the spool 8 is at a first selecting position shown in the drawing where the spool 8 has moved leftward, the second output through hole $B_1$ communicates with the supply through hole $P_1$ and fluid pressure increases. Therefore, the second pressure sensor 23b operates to output a detection signal. When the spool 8 is at a second selecting position where the spool 8 has moved rightward, the first output through hole $A_1$ communicates with the supply through hole $P_1$ and fluid pressure increases. Therefore, the first pressure sensor 23a operates to output a detection signal.

Because structures and operations of the second embodiment other than those described above are substantially similar to those of the first embodiment, main similar components are provided with reference numerals similar to those of the first embodiment to omit descriptions of the components. Although the spool 8 having the magnets 12a and 12b is shown in the drawing in the second embodiment so as to share parts with the first embodiment, it is needless to say that the spool 8 without the magnets 12a and 12b may be used.

Although the magnetometric sensors 22a and 22b or the pressure sensors 23a and 23b are used independently in the first and second embodiments, both the sensors may be used. In this case, the pressure sensors 23a and 23b may be incorporated in a form shown in FIG. 2 into the manifold valve shown in FIG. 1 in which the magnetometric sensors 22a and 22b are used. Sensor lamps for both the magnetometric sensors and the pressure sensors or sensor lamps for the magnetometric sensors or the pressure sensors may be provided. With regard to the sensor connector 34, the first relay connector 31, the second relay connector 39, and the like, the numbers of terminals are increased according to the number of the position sensors.

It is effective in terms of reliability and safety to use the magnetometric sensors 22a and 22b and the pressure sensors 23a and 23b in combination because a position of the spool 8 can be detected twice by using different elements.

Although the operating position at opposite stroke ends of reciprocation of the spool is detected by the two position sensors in the above respective embodiments, the operating position of the spool may be detected at either of the stroke ends. In this case, only one position sensor may be used.

If the magnetometric sensor is used, it is possible that only one magnetometric sensor 22a or 22b is disposed to detect a magnetic flux density of the magnet 12a or 12b mounted to one end of the spool 8 in a range of the whole stroke in an analog fashion to detect the operating position of the spool 8 in a range of the whole stroke from variation in the magnetic flux density.

Although each the above embodiment is the double-pilot-type selector valve having the two pilot valves 5a and 5b disposed respectively on opposite sides of the main valve portion 4, the pilot valves may be provided to either side of the main valve portion 4 in a concentrated manner.

It is also possible to form the selector valve as a single-pilot-type selector valve having one pilot valve. In this case, one of the two pistons on opposite sides of the spool has a smaller diameter than the other, pilot fluid is constantly supplied to the pressure chamber on the side of the small-diameter piston, and the pilot valve is turned on and off to supply or discharge pilot fluid to and from the pressure chamber on the side of the large-diameter piston to thereby switch the spool valve. It is also possible that a biasing force of a return spring constantly acts on the small-diameter piston instead of the pilot fluid pressure or that both the pilot fluid pressure and biasing force of the return spring act on the small-diameter piston to supply and discharge the pilot fluid to and from the pressure chamber on the side of the large-diameter piston by the pilot valve.

As described above, according to the invention, not only mounting of the position sensors to the selector valve but also connection of the position sensors and the pilot valves is easy because the position sensor and the pilot valve are connected to the main wiring substrate through the common relay connector. Furthermore, because there is no need to route the lead wires from the position sensors and the pilot valves outside, wiring is easy. Moreover, because there is no need to detach the position sensors from the selector valve or to cut the lead wire between the selector valve and the manifold base in order to separate the manifold base and the selector valve from each other in maintenance, handling is easy.

The part housing chamber is formed in the upper face of the casing, the lamp substrate is housed in the part housing chamber, and the lamps for indicating the operating states of the plot valves and the position sensors are mounted onto the lamp substrate. Therefore, the operating states of the pilot valves and the spool can be reliably and clearly indicated on the selector valve with the simple indicating mechanism.

What is claimed is:

1. A manifold valve having a position detecting mechanism, the valve comprising: a selector valve for selecting a flow path of pressure fluid and a manifold base mounted with the selector valve, wherein the selector valve includes a casing having a mounting face to be mounted to the manifold base, a spool provided in the casing to select the flow path, and one or two solenoid-operated pilot valve(s) for driving the spool, the casing includes a first recessed portion formed at a portion of the mounting face and a part housing chamber formed at a different position from the first recessed portion, one or more position sensors for detecting an operating position of the spool are housed in the part housing chamber, a first relay connector for both signal transmission and feeding and electrically connected to both the position sensors and pilot valves is housed in the first recessed portion, the manifold base includes a placing face on which the selector valve is mounted, a second recessed portion formed at a position on the placing face corresponding to the first recessed portion, and a substrate housing chamber inside the base and connected to the second recessed portion, a second relay connector to be electrically connected to the first relay connector by mounting the selector valve onto the placing face is housed in the second recessed portion, and a main wiring substrate for signal processing, signal transmission, and feeding and electrically connected to the second relay connector is housed in the substrate housing chamber.

2. A manifold valve according to claim 1, wherein the part housing chamber is formed on an upper face side of the casing and is covered with a detachable cover, a lamp substrate is disposed in the part housing chamber and is electrically connected to both the pilot valves and position sensors, lamps for individually indicating operating states of the pilot valves and the position sensors are mounted onto the lamp substrate, and the cover is provided with an indicating window through which the lamps are observed.

3. In a manifold valve according to claim 2, wherein substrate supports individually and electrically connected to the pilot valves and also functioning as terminals are provided in the part housing chamber, support legs also functioning as connectors are provided to the lamp substrate, the lamp substrate is detachably disposed in the part housing chamber by supporting the support legs on the substrate supports in electrically connected states, and a sensor connector for electrically connecting the position sensors to the lamp substrate and the first relay connector is detachably connected to the lamp substrate.

4. A manifold valve according to claim 1, wherein the position sensor(s) is (are) a magnetometric sensor for detecting a magnet mounted to the spool and/or a pressure sensor for detecting fluid pressure of an output flow path.

5. A manifold valve according to claim 2, wherein the position sensor(s) is (are) a magnetometric sensor for detecting a magnet mounted to the spool and/or a pressure sensor for detecting fluid pressure of an output flow path.

6. A manifold valve according to claim 3, wherein the position sensor(s) is (are) a magnetometric sensor for detecting a magnet mounted to the spool and/or a pressure sensor for detecting fluid pressure of an output flow path.

* * * * *